(12) United States Patent
Cho et al.

(10) Patent No.: US 9,175,152 B2
(45) Date of Patent: Nov. 3, 2015

(54) EMULSION COMPOSITION FOR MANUFACTURING POLYALKYLENE CARBONATE PRODUCT AND RESIN PRODUCT USING THE SAME

(71) Applicant: LG CHEM, LTD., Seoul (KR)

(72) Inventors: Hyun Ju Cho, Daejeon (KR); Jin-Hwa Seo, Daejeon (KR); Seung Young Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/382,144

(22) PCT Filed: Jun. 21, 2013

(86) PCT No.: PCT/KR2013/005504
§ 371 (c)(1),
(2) Date: Aug. 29, 2014

(87) PCT Pub. No.: WO2014/003370
PCT Pub. Date: Jan. 3, 2014

(65) Prior Publication Data
US 2015/0051314 A1 Feb. 19, 2015

(30) Foreign Application Priority Data

Jun. 25, 2012 (KR) .................. 10-2012-0068083
Jun. 21, 2013 (KR) .................. 10-2013-0071449

(51) Int. Cl.
| | | |
|---|---|---|
| C08K 5/42 | (2006.01) |
| C08J 5/02 | (2006.01) |
| C08K 5/00 | (2006.01) |
| C08J 3/02 | (2006.01) |
| C08K 5/01 | (2006.01) |

(52) U.S. Cl.
CPC ... C08K 5/42 (2013.01); C08J 3/02 (2013.01); C08J 5/02 (2013.01); C08K 5/0008 (2013.01); C08K 5/01 (2013.01)

(58) Field of Classification Search
CPC ................................. C08K 5/0008; C08J 5/02
See application file for complete search history.

(56) References Cited

U.S. PATENT DOCUMENTS

| | | | |
|---|---|---|---|
| 5,376,406 A | * | 12/1994 | Asanuma et al. ............. 427/226 |
| 2011/0281048 A1 | * | 11/2011 | Yoon et al. .................. 428/35.7 |
| 2012/0264854 A1 | * | 10/2012 | Courtois et al. ............... 524/27 |
| 2015/0105501 A1 | * | 4/2015 | Cho et al. ....................... 524/45 |

FOREIGN PATENT DOCUMENTS

| | | |
|---|---|---|
| EP | 0649867 | 4/1995 |
| JP | 06-015620 B2 | 3/1994 |
| JP | 07-090092 A | 4/1995 |
| JP | 11-349797 A | 12/1999 |
| JP | 2006-193518 | 7/2006 |
| JP | 2009-221450 A | 10/2009 |
| JP | 2011-002830 A | 1/2011 |
| JP | 2012-508294 A | 4/2012 |
| KR | 10-2003-0064986 | 8/2003 |
| KR | 10-0760787 | 10/2007 |
| KR | 10-0768628 | 10/2007 |
| KR | 10-0867391 | 11/2008 |
| KR | 10-2010-0047234 | 5/2010 |
| KR | 10-2010-0074196 | 7/2010 |
| KR | 10-2010-0126229 | 12/2010 |
| KR | 10-2011-0081235 | 7/2011 |
| KR | 10-2012-0125438 A | 11/2012 |
| KR | 10-2013-0029502 | 3/2013 |
| WO | 2012140181 A1 | 10/2012 |

\* cited by examiner

*Primary Examiner* — Vickey Nerangis
(74) *Attorney, Agent, or Firm* — Dentons US LLP

(57) ABSTRACT

The present invention relates to an emulsion composition for manufacturing a polyalkylene carbonate molded product and a molded product manufactured by using the same. The emulsion composition according to the present invention provides a resin molded product that has biodegradability and complete combustion decomposability to show environment-friendly feature and rubber-like properties.

16 Claims, 3 Drawing Sheets

EMULSION COMPOSITION FOR MANUFACTURING POLYALKYLENE CARBONATE PRODUCT AND RESIN PRODUCT USING THE SAME

This application is a 35 USC §371 National Stage entry of International Application No. PCT/KR2013/005504 filed on Jun. 21, 2013, and claims priority to Korean Application Nos. 10-2012-0068083 filed on Jun. 25, 2012 and 10-2013-0071449 filed on Jun. 21, 2013, which are hereby incorporated by reference in their entireties as if fully set forth herein.

TECHNICAL FIELD

The present invention relates to an emulsion composition for manufacturing a polyalkylene carbonate molded product and a resin molded product manufactured by using the same.

BACKGROUND OF ART

Recently, there have been widely used disposable resin molded products including disposable gloves, packaging films, disposable containers such as disposable cups or plates, and rubber molded products used for building materials and automotive interior materials. For example, disposable gloves are hard-to-recycle single-use work gloves, and have been consumed mainly for industrial uses in the fields of medicine, chemistry or chemical engineering, and in recent years, used and consumed in wider range of applications related to sanitation or human health, including foods or cosmetics.

These disposable resin molded products, for example, disposable gloves can be manufactured from various resin materials that are thin and elastic with rubber-like properties, for example, from various resins having properties identical or similar to those of rubber such as synthetic polyisoprene, polychloroprene, polyurethane, polyvinyl chloride, polystyrene-butadiene-styrene, styrene-isoprene-styrene, silicon, polybutadiene methyl methacrylate, polyacrylonitrile, or polystyrene-ethylene-butylstyrene.

However, the disposable resin molded products manufactured from those resin materials are hard to decompose in an environment-friendly way and toxic gases emitted due to incomplete combustion when landfilled or incinerated seriously cause environmental pollution.

For that reason, many efforts have been made to manufacture the disposable resin molded product from various biodegradable resin materials. Unfortunately, there has never been developed yet such a disposable resin molded product that is not only biodegradable but also satisfactory in acquiring rubber-like mechanical properties including elasticity, elongation, or strength necessary to the disposable resin molded products such as disposable gloves or the like.

DETAILED DESCRIPTION OF THE INVENTION

Technical Problem

Accordingly, the present invention provides a composition for providing a resin molded product that has not only rubber-like properties but also biodegradability, thereby having an environment-friendly feature.

Further, the present invention provides a resin molded product that is manufactured by using the composition.

Technical Solution

According to the present invention, provided is an emulsion composition for manufacturing a polyalkylene carbonate molded product, including a continuous phase containing water; and resin particles which are dispersed in the continuous phase and contain a polyalkylene carbonate resin, a first surfactant, and a second surfactant, in which the second surfactant concentration is higher at the core of the particle than at the surface of the particle and the first surfactant concentration is higher at the surface of the particle than at the core of the particle.

Herein, the content of the first surfactant at the core of the resin particle may be less than 5% by weight, based on the total weight of the first surfactant contained in the resin particle. Further, the content of the first surfactant farther away from half the particle radius from the core of the resin particle may be 95% by weight or more, based on the total weight of the first surfactant contained in the resin particle.

The content of the second surfactant at the core of the resin particle may be 95% by weight or more, based on the total weight of the second surfactant contained in the resin particle. Further, the content of the second surfactant farther away from two-thirds of the particle radius from the core of the resin particle may be less than 5% by weight, based on the total weight of the second surfactant contained in the resin particle.

Meanwhile, the resin particle may contain 1 to 20 parts by weight of the first surfactant and 1 to 20 parts by weight of the second surfactant, based on 100 parts by weight of the polyalkylene carbonate resin.

Further, a weight ratio of the second surfactant to the first surfactant may be 1:0.1 to 1:2.

Further, the resin particle may have a diameter of 200 to 600 nm.

Further, the composition may have a viscosity of 1 to 70 cP.

Meanwhile, the polyalkylene carbonate resin may contain a repeating unit represented by the following Chemical Formula 1:

[Chemical Formula 1]

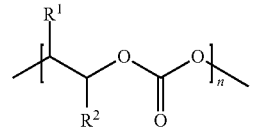

wherein n is an integer of 10 to 1000,
$R^1$ and $R^2$ are each independently hydrogen, an alkyl group having 1 to 20 carbon atoms, an aryl group having 6 to 20 carbon atoms, an alkenyl group having 1 to 20 carbon atoms, or a cycloalkyl group having 3 to 20 carbon atoms, and $R^1$ and $R^2$ may be connected to each other to form a cycloalkyl group having 3 to 10 carbon atoms.

Further, the first surfactant may be one or more compounds selected from the group consisting of anionic surfactants and nonionic surfactants.

Further, the second surfactant may be one or more compounds selected from the group consisting of alcohols having 10 to 40 carbon atoms, alkanes, mercaptans, carboxylic acids, ketones, amines, and nonionic surfactants having HLB (Hydrophile-Lipophile Balance) of 11 or less.

Further, the resin particle may further contain one or more hydrophilic polymers selected from the group consisting of cellulose, polyvinyl alcohol, polyacrylic acid, and polymethacrylic acid.

On the other hand, according to the present invention, provided is a polyalkylene carbonate molded product that is manufactured by using the emulsion composition.

Herein, the molded product may be a disposable resin molded product of a disposable grove, a disposable film, a disposable container, or a disposable rubber molded product.

Advantageous Effects

The emulsion composition according to the present invention provides a resin molded product that has biodegradability and complete combustion decomposability to show environment-friendly feature and rubber-like properties. Therefore, the resin molded product can be applied to various molded products requiring elasticity, and in particular, preferably applied to disposable groves, disposable containers, and disposable rubber molded products.

DETAILED DESCRIPTION OF THE EMBODIMENTS

Figure 1:
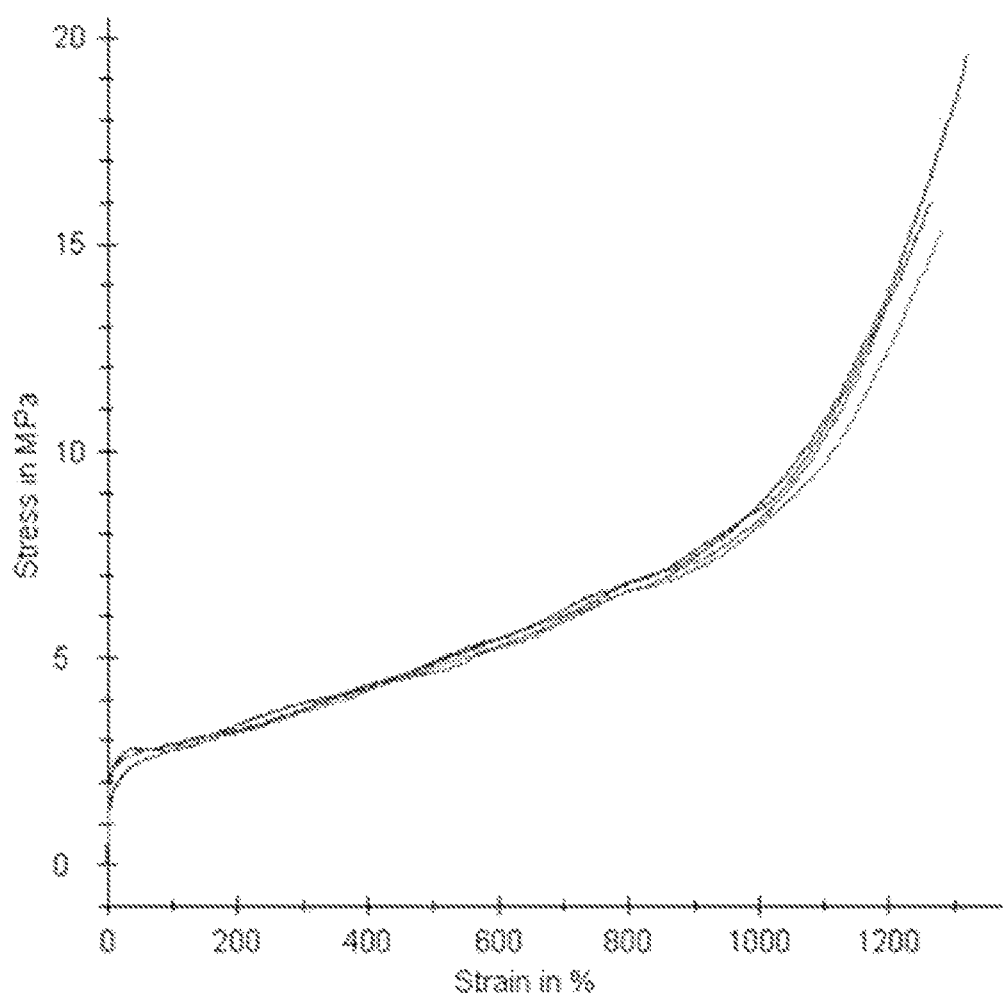
FIG. 1 is a graph (S-S curve) of tensile properties of the resin film according to Example 1 of the present invention.

Hereinafter, a description will be given about an emulsion composition for manufacturing a polyalkylene carbonate molded product and a resin molded product manufactured by using the same according to the specific embodiments of the present invention.

Unless otherwise specified throughout this specification, the technical terms used herein are only for reference to specific embodiments and is not intended to limit the present invention. A singular form used herein includes a plural form unless the phrases clearly define contrarily.

Further, the term "include" specifies a specific feature, region, integer, step, action, element, or component, but does not exclude the addition of a different specific feature, area, integer, step, action, element, component, or group.

Though terms including ordinal numbers such as "a first", "a second", etc. may be used to explain various components, the components are not limited to the terms. The terms are used only for the purposed of distinguishing one component from another component. For instance, a first component may be referred to as a second component, or similarly, the second component may be referred to as the first component, without departing from the scope of the present invention.

Further, the meaning that any component "substantially does not exist" in a specific region of the resin particle is construed as that the content of any component in the specific region of the resin particle is less than about 5% by weight, or less than about 3% by weight, or less than about 1% by weight, based on the total weight of any component included in the resin particle.

Further, the term "disposable resin molded product" refers to any recycled resin molded product that is not designed for permanent or semi-permanent use but disposed or recycled through a defined process after single use or several times of use, for example, less than 10 times, preferably less than 5 times. This disposable resin molded product may include a resin layer satisfying the rubber-like elongation and strength requirements or may consist of the resin layer alone. Examples of the molded product may include a disposable glove, a disposable film, a disposable container such as a disposable cup or dish, a building material, or an automotive interior material. The usage of the disposable resin molded product is not specifically limited and may encompass a wide range of applications in the fields of medicine, chemistry, chemical engineering, or cosmetics.

On the other hand, the present inventors have studied a biodegradable resin molded product, and they have found out that an emulsion composition containing polyalkylene carbonate resin particles in which distributions of a first surfactant and a second surfactant are controlled is able to form a film having more improved stability. Furthermore, the resin particles contained in the emulsion composition can be controlled to have more uniform particle size, and thus it is possible to provide a molded product manufactured by using the same with more improved touch as well as more improved mechanical properties such as tensile strength or the like, thereby completing the present invention.

In this regard, when the previous latex resin composition is used, a resin film can be formed by a coating method. However, since the formed resin film has low stability, there is a limit in manufacturing a molded product having a complex structure, and there is a problem that mechanical properties of the resin film are deteriorated. In contrast, because the composition applied in manufacturing the polyalkylene carbonate-based resin film according to the present invention includes the resin particles, the composition has excellent stability, compared to the previous latex resin composition and it is possible to control the uniform size of resin particles. Therefore, a resin film having a uniform thickness and excellent mechanical properties can be more stably formed using the composition by a simple method such as dip molding or coating.

According to one embodiment of the present invention, provided is an emulsion composition for manufacturing a polyalkylene carbonate molded product, including a continuous phase containing water; and resin particles which are dispersed in the continuous phase and contain a polyalkylene carbonate resin, a first surfactant, and a second surfactant, in which the second surfactant concentration is higher at the core of the particle than at the surface of the particle and the first surfactant concentration is higher at the surface of the particle than at the core of the particle.

That is, the composition according to one embodiment, as an oil-in-water type composition, may include a continuous phase containing water and a discontinuous phase containing the resin particles. The resin particle may have a particle core containing the polyalkylene carbonate resin and the second surfactant and a particle surface surrounding the core and containing the first surfactant.

Herein, the polyalkylene carbonate resin contained in the resin particles is a non-crystalline transparent resin. Unlike aromatic polycarbonate resins that are engineering plastics of a similar series, the polyalkylene carbonate resin has advantages that it is biodegradable and thermally decomposable at a low temperature, and completely decomposed into carbon dioxide and water with no carbon residue left behind. In addition, the polyalkylene carbonate resin has a relatively low glass transition temperature (Tg) below about 40° C., for example, about 10 to 40° C. as adjustable within the range (Inoue et al. *Polymer J.*, 1982, 14, 327-330).

In one embodiment, the polyalkylene carbonate resin is a kind of polycarbonate polymers prepared from an epoxide compound, for example, an alkylene oxide compound and carbon dioxide used as monomers through copolymerization, and can be defined as a homopolymer or copolymer including a repeating unit of the following Chemical Formula 1:

[Chemical Formula 1]

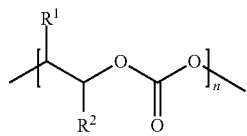

wherein n is an integer of 10 to 1000, $R^1$ and $R^2$ are each independently hydrogen, an alkyl group having 1 to 20 carbon atoms, an aryl group having 6 to 20 carbon atoms, an alkenyl group having 1 to 20 carbon atoms or a cycloalkyl group having 3 to 20 carbon atoms, and $R^1$ and $R^2$ are connected to each other to form a cycloalkyl group having 3 to 10 carbon atoms.

The polyalkylene carbonate resin can be obtained using an epoxide-based monomer, for example, ethylene oxide, propylene oxide, 1-butene oxide, 2-butene oxide, isobutyrene oxide, 1-pentene oxide, 2-pentene oxide, 1-hexene oxide, 1-octene oxide, cyclopentene oxide, cyclohexene oxide, styrene oxide, or butadiene monoxide, or using two or more of the different epoxide-based monomers.

To maintain the characteristic properties pertaining to the repeating unit, the polyalkylene carbonate resin may be a homopolymer consisting of the repeating unit, or a copolymer containing the repeating unit. For example, the polyalkylene carbonate resin may be a copolymer of two or more repeating units belonging to the category of Chemical Formula 1, or a copolymer containing the repeating unit and an alkylene oxide resin-based repeating unit. In order to maintain the characteristic properties pertaining to the repeating unit of Chemical Formula 1, for example, biodegradability or low glass transition temperature, the polyalkylene carbonate resin can be a copolymer containing one or more of the repeating unit of Chemical Formula 1 in an amount of about 40 mole % or more, preferably about 60 mole % or more, and more preferably about 80 mole % or more.

Further, the repeating unit of Chemical Formula 1 includes different functional groups as substituents, such as hydrogen, an alkyl group having 1 to 20 carbon atoms, an aryl group having 6 to 20 carbon atoms, an alkenyl group having 1 to 20 carbon atoms, or a cycloalkyl group having 3 to 20 carbon atoms. Among these functional groups, a proper one is selected as a substituent in consideration of the mechanical properties or biodegradability of a desired polyalkylene carbonate resin. For example, the polyalkylene carbonate resin including the repeating unit of Chemical Formula 1 is superior in terms of biodegradability when the substituent is a hydrogen atom or a functional group containing a relatively small number of carbon atoms (e.g., an alkyl or cycloalkyl group having a small number of carbon atoms) as a substituent; or superior in terms of mechanical properties such as strength when the substituent is a functional group containing a relatively large number of carbon atoms. For specific example, it was reported that the polyethylene carbonate resin is biodegraded more rapidly than the polypropylene carbonate resin (Inoue et al. *Chem. Pharm. Bull, Jpn,* 1983, 31, 1400; Ree et al. *Catalysis Today,* 2006, 115, 288-294).

In the polyalkylene carbonate resin, the degree of polymerization (n) of the repeating unit of Chemical Formula 1 may be 10 to 1000, and preferably 50 to 500. The polyalkylene carbonate resin containing the same may have a weight average molecular weight of about 10,000 to 1,000,000, and preferably, about 50,000 to 500,000. As the repeating unit and the polyalkylene carbonate resin have a degree of polymerization and a weight average molecular weight in such ranges, the resin layer or the disposable resin molded product manufactured from the same can have biodegradability as well appropriate mechanical properties such as strength.

According to one embodiment, the resin particle may further include a hydrophilic polymer typically used in the art pertaining to the present invention, in addition to the polyalkylene carbonate resin. The hydrophilic polymer makes properties of the composition including the resin particles more uniform when the composition is applied. Non-limiting example of the hydrophilic polymer may be one or more compounds selected from the group consisting of cellulose, polyvinyl alcohol, polyacrylic acid, and poly methacrylic acid. However, the content of the hydrophilic polymer may be determined considering its effects on biodegradability and mechanical properties of the resin film required in the present invention, and for example, the content may be 20 parts by weight or less, preferably 0.01 to 20 parts by weight, and more preferably 0.1 to 10 parts by weight, based on 100 parts by weight of the polyalkylene carbonate resin.

Meanwhile, the resin particles included in the emulsion composition of one embodiment include the first surfactant and the second surfactant together with the above mentioned polyalkylene carbonate resin.

In particular, the first surfactant and the second surfactant have different concentration distributions at the core and surface of the resin particle. According to one embodiment, the first surfactant concentration is higher at the surface of the resin particle than at the core of resin particle. On the contrary, the second surfactant concentration is higher at the core of the resin particle than at the surface of resin particle. Furthermore, the first surfactant may not substantially exist at the core of the resin particle and the second surfactant may not substantially exist at the surface of the resin particle.

Herein, the "core" of the resin particle means the region within two-thirds of the radius from the center of the resin particle or the region within half the radius from the center of the resin particle. Further, the "surface" of the resin particle means a region excluding the core from the resin particle.

The meaning that the first or second surfactant "substantially does not exist" in a specific region of the resin particle is construed as that the content of the first or second surfactant in the specific region of the resin particle is less than about 5% by weight, or less than about 3% by weight, or less than about 1% by weight, based on the total weight of the first or second surfactant included in the resin particle.

In other words, the first surfactant may not exist in the region within half or two-thirds of the radius of the resin particle from the center of the resin particle. In other region (that is, surface of the resin particle), about 95% by weight or more of the first surfactant contained in the resin particle may be included. Further, the second surfactant may not substantially exist in the region (that is, surface of the resin particle) farther away from half or two-thirds of the radius of the resin particle from the center of the resin particle. In the core of the resin particle, about 95% by weight or more of the second surfactant contained in the resin particle may be included, together with the polyalkylene carbonate resin.

As described above, the resin particles included in the resin film according to one embodiment may have the particle core containing the polyalkylene carbonate resin and the second surfactant and the particle surface surrounding the core and containing the first surfactant. The second surfactant does not substantially exist at the surface of the particle, and the first surfactant does not exist deeper than a predetermined depth of the resin particle.

As such, because the concentration distributions of the first surfactant and the second surfactant are controlled within the resin particle, the polyalkylene carbonate resin can exist as a particle having a more stable and uniform size, and the resin particles can be stably distributed in the composition. Furthermore, coagulation between the resin particles is minimized, and thus high content of the effective solid components distributed in the composition is maintained so as to form a molded product having more uniform thickness and physical properties when the composition is applied.

In this connection, if the resin particles included in the emulsion composition are unstable, coagulation and precipitation of resin particles may occur and therefore, the content of the effective solid components distributed in the composition is decreased (herein, the 'content of the effective solid components' means the content of the resin particles and other additives which are solid components that stably exist in a dispersed phase within the composition and can be directly used in the manufacture of the resin molded product, excluding coagulation formed by coagulation of the resin particles and precipitates thereof). From this point of view, as the resin particles according to one embodiment are formed by including the first surfactant and the second surfactant at the same time according to the above mentioned concentration distribution, the resin particles are able to form a more stable dispersed phase in the composition and coagulation between particles can be minimized to maintain high content of effective solid components dispersed in the composition. If any one of the first surfactant and the second surfactant is not included, or does not satisfy the concentration distribution of the above embodiment, the content of effective solid components dispersed in the composition is decreased due to coagulation between unstable resin particles, and consequently, it is difficult to manufacture a resin molded product having uniform thickness and physical properties.

Herein, the presence of the first surfactant can be identified by MALDI-TOF Mass, GC/Mass, and NMR analysis of the supernatant that is obtained by centrifugation of the composition including the resin particles. Further, the presence of the second surfactant can be identified by MALDI-TOF Mass, GC/Mass, and NMR analysis of the precipitate that is obtained by centrifugation of the composition including the resin particles. As described below, if a water solvent is included in the emulsion composition, the second surfactant is less hydrophilic than the first surfactant, and thus the second surfactant having relatively low hydrophilicity is distributed at the core of the resin particle, and the first surfactant having relatively high hydrophilicity is distributed at the surface of the resin particle. Therefore, it is possible to predict the structure of the resin particle including the first surfactant and the second surfactant.

Meanwhile, according to one embodiment, the resin film can be obtained from the emulsion composition including the resin particles. Herein, if the emulsion composition is, for example, a water solvent, the first surfactant and the second surfactant are compounds showing the above described concentration distribution, and they can be determined, considering the difference in hydrophilicity. That is, the second surfactant is a substance having lower hydrophilicity or having lower HLB (Hydrophile-Lipophile Balance) than the first surfactant, and it is possible to give the above described concentration distribution.

According to one embodiment, the first surfactant may be one or more compounds selected from the group consisting of anionic surfactants and nonionic surfactants. Preferably, the first surfactant may be one or more compounds selected from the group consisting of carboxylic acid salts, sulfonic acid salts, sulfuric acid ester salts, phosphoric acid ester salts, quaternary ammonium salt, ether, esterether, ester, nitrogen-containing surfactants. These compounds are those typically used in the art pertaining to the present invention without particular limitation. However, according to one embodiment, the first surfactant may be an anionic surfactant such as alkyl benzene sodium sulfonate, alkyl sodium sulfonate, polyethylene oxide alkyl ether, polyethylene oxide alkyl phenyl ether, polyethylene oxide alkyl ether sulfonate, polyethylene oxide alkyl ether phosphate, sodium lauryl sulfate, alkylether carbonate, alkylether sulfate, alkylaryl ether sulfate, alkylamide sulfate, alkyl phosphate, alkylether phosphate, and alkylaryl ether phosphate; a nonionic surfactant such as alkyl polyoxyethylene ether, alkylaryl polyoxyethylene ether, alkylaryl formaldehyde condensed polyoxyethylene ether, a block copolymer of hydrophobic polyoxypropylene, polyoxyethylene ether of glycerin ester, polyoxyethylene ether of sorbitan ester, polyoxyethylene ether of sorbitol ester, polyethylene glycol fatty acid ester, glycerin ester, sorbitan ester, propylene glycol ester, sugar ester, fatty acid alkanolamide, polyoxyethylene fatty acid amide, polyoxyethylene alkyl amine, and amine oxide; or a mixture thereof.

The first surfactant may be included in an amount of 1 to 20 parts by weight, preferably 1 to 15 parts by weight, and more preferably 1 to 10 parts by weight, based on 100 parts by weight of the above described polyalkylene carbonate resin. That is, it is preferable that the content of the first surfactant is within the above range, considering sufficient formation of the surface surrounding the core of the resin particle, and problems such as reduction in the processability and mechanical properties of the resin molded product generated by excessive addition of the first surfactant.

Meanwhile, the second surfactant reduces water solubility of the resin particles present in the solvent to prevent coagulation between resin particles, and as described above, its type can be selected considering the relationship with the first surfactant. Non-limiting examples of the second surfactant may be one or more compounds selected from the group consisting of alcohols having 10 to 40 carbon atoms, alkanes, mercaptans, carboxylic acids, ketones, amines, and nonionic surfactants having HLB (Hydrophile-Lipophile Balance) of 11 or less. Preferably, the second surfactant may be hexadecane, cetyl alcohol, polyoxyethylene stearyl ether, polyoxyethylene stearyl amine, polyoxyethylene stearyl ester, polyoxyethylene monostearate, polyoxyethylene sorbitan monooleate, polyoxyethylene lauryl ether, ethoxylated alcohols having 10 to 20 carbon atoms, ethoxylated octylphenol, ethoxylated fatty acid ester, sorbitan laurate, sorbitan monostearate, propylene glycol monostearate, ethylene glycol monostearate, sorbitan fatty acid ester, polyoxyethylene sorbitan fatty acid ester or a mixture thereof.

The second surfactant may be included in an amount of 1 to 20 parts by weight, preferably 1 to 15 parts by weight, and more preferably 1 to 10 parts by weight, based on 100 parts by weight of the above described polyalkylene carbonate resin. That is, it is preferable that the content of the second surfactant is within the above range, considering more stable formation of the resin particles, difficulties in the control of the particle size and the composition stability which are generated by excessive addition of the second surfactant, and changes in the physical properties of the resin molded product.

Furthermore, in order to form and maintain more stable resin particles, a weight ratio of the second surfactant to the first surfactant can be controlled to be 1:0.1 to 1:2, preferably 1:0.2 to 1:1, and more preferably 1:0.3 to 1:0.6.

Meanwhile, an organic solvent may be contained at the core of the resin particle.

The organic solvent may be selected from the typical solvents in which the polyalkylene carbonate resin can be dissolved, and the constitution is not particularly limited. However, according to one embodiment, the organic solvent may be one or more solvents selected from the group consisting of methyl acetate, ethyl acetate, propyl acetate, isopropyl acetate, vinyl acetate, methyl ethyl ketone, dichloromethane, dichloroethane, chloroform, acetonitrile, methylpyrrolidone, dimethyl sulfoxide, nitromethane, nitropropane, caprolactone, acetone, polypropylene oxide, tetrahydrofuran, benzene, and styrene.

Further, the content of the organic solvent may be determined, considering formation efficiency and stability of the resin particles. For non-limiting example, the organic solvent may be included in an amount of 50 to 1000 parts by weight, preferably 100 to 1000 parts by weight, and more preferably 200 to 1000 parts by weight, based on 100 parts by weight of the polyalkylene carbonate resin.

Meanwhile, the resin particle may have a diameter of 200 to 600 nm, preferably 250 to 600 nm, and more preferably 250 to 550 nm. That is, it is preferable that the diameter of the resin particle satisfies the above range, in order to maintain the content of the effective solid components included in the emulsion composition and to form a film having a uniform thickness during manufacture of the resin molded product. If the diameter of the resin particle does not satisfies the above described range (e.g., the diameter exceeds 600 nm), stability of the resin particle is reduced, and thus it is difficult to secure sufficient content of the solid components included in the emulsion composition, and it is also difficult to form a resin molded product having a uniform thickness and physical properties by using the same.

Further, the solid content of the emulsion composition is 10 to 50% by weight, preferably 10 to 40% by weight, and more preferably 10 to 30% by weight, based on the total weight of the composition, which is advantageous in terms of processability of the resin molded product. The viscosity of the emulsion composition is 1 to 70 cP, preferably 1 to 50 cP, and more preferably 2 to 30 cP, which is advantageous in terms of processability.

In addition, the emulsion composition may further include additives such as an antifoaming agent, a hydrophilic polymer or the like in order to secure more uniform physical properties upon applying the composition. At this time, the antifoaming agent may be those typically used in the art pertaining to the present invention, and the constitution is not particularly limited, but a silicone-based antifoaming agent is preferred. The antifoaming agent may be added in an amount of 0.001 to 0.1 parts by weight, based on the total weight of the composition.

Meanwhile, according to another embodiment of the present invention, provided is a method for preparing the emulsion composition for manufacturing the polyalkylene carbonate molded product, including the steps of preparing an organic solution containing the polyalkylene carbonate resin, the second surfactant and the organic solvent; and preparing an aqueous solution containing the first surfactant; and mixing the organic solution and the aqueous solution.

The preparation method of the emulsion composition can be performed according to a preparation method of an oil-in-water emulsion composition typically used in the art pertaining to the present invention, for example, direct emulsification or phase inversion emulsification, except that the above described polyalkylene carbonate resin, the first surfactant, and the second surfactant are used. According to one embodiment, the polyalkylene carbonate resin and the second surfactant are added to an organic solvent, and completely dissolved using a homogenizer to prepare an organic solution. Separately, an aqueous solution containing the first surfactant is prepared. The aqueous solution and the organic solution thus prepared are mixed with each other, and stirred for stabilization to prepare the emulsion composition. If the phase inversion emulsification is performed, the step of mixing the organic solution and the aqueous solution may be performed by a method including the steps of adding the aqueous solution to the organic solution to form a water-in-oil (W/O) emulsion composition; and increasing the supply of the aqueous solution to convert the water-in-oil (W/O) emulsion composition into an oil-in-water (O/W) emulsion composition by phase inversion.

Meanwhile, according to still another embodiment, provided is a polyalkylene carbonate molded product that is manufactured by using the above described emulsion composition.

Herein, the molded product may be a disposable resin molded product of a disposable grove, a disposable film, a disposable container, or a disposable rubber molded product.

This disposable resin molded product may include the resin film formed from the emulsion composition according to the present invention or may consist of the resin film alone. Examples of the molded product include disposable rubber or resin molded products combustible in incineration such as disposable gloves, disposable films, disposable containers such as disposable cups or plates, and building materials or automotive interior materials. The use of the disposable resin molded product is not particularly limited, and may encompass a wide range of applications in the fields of medicine, chemistry, chemical engineering, food or cosmetics.

The molded product can be manufactured by adding the above described emulsion composition to a mold having the shape of the molded product or applying it to a substrate, drying and curing (or crosslinking) the composition, and then separating the product from the mold or substrate. At this time, the method of coating the composition may be performed by a method typically used in the art pertaining to the present invention, and is not particularly limited. The step of drying the coating layer is a step of forming a resin molded product by evaporating the solvent such as moisture contained in the coating layer. Preferably, the step may be performed at a temperature to form a resin molded product having uniform physical properties due to coagulation phenomena between the resin particles, for example, at a temperature of 70 to 160° C., or 90 to 140° C., or 100 to 130° C.

As such, the molded product manufactured by using the above described emulsion composition is advantageous in that it can be elongated at a high rate with a low stress, compared to the previous latex films (e.g., nitrile-based films) and has excellent mechanical properties such as higher maximum elongation.

According to one embodiment, of the molded products, the polyalkylene carbonate-based resin film has physical properties of a stress of 8 MPa or less at 500% elongation, an elongation at break of 800% to 1600%, and a fracture stress of 5 to 25 MPa at a thickness of 30 to 70 μm. As shown in comparison of FIGS. 1 and 2, the resin film of one embodiment (FIG. 1: S-S curve of the resin film according to Example 1) has a stress of 8 MPa or less at 500% elongation at a thickness of about 55 μm, whereas the previous nitrile latex films (FIG. 2: S-S curve of the resin film according to Control Example 1) has a stress of about 25 MPa at 500% elongation, and thus it can be elongated at a higher rate with a lower stress.

This physical property is closely related to wearing comfort of the disposable resin molded products, in particular, disposable gloves. As the resin film of one embodiment can be elongated at a high rate with a lower stress, it is able to exhibit advantages of excellent elasticity and wearing comfort.

Further, according to one embodiment, the resin film has physical property of a stress of 2 to 8 MPa at 300% to 500% elongation at a thickness of 30 to 70 μm; preferably a stress of 4 to 8 MPa at 300% to 500% elongation at a thickness of 40 to 60 μm.

Furthermore, according to another embodiment, the resin film has physical property of a stress of 2 to 6 MPa at 300% elongation at a thickness of 30 to 70 μm; preferably a stress of 4 to 6 MPa at 300% elongation at a thickness of 40 to 60 μm.

Furthermore, according to still another embodiment, the resin film has physical property of a stress of 3 to 8 MPa at 500% elongation at a thickness of 30 to 70 μm; preferably a stress of 5 to 8 MPa at 500% elongation at a thickness of 40 to 60 μm.

Furthermore, the resin film has physical properties of an elongation at break of 800% to 1600%, preferably 800% to 1300%, and more preferably 800% to 1000%; and a fracture stress of 5 to 25 MPa, preferably 10 to 20 MPa, and more preferably 10 to 15 MPa at a thickness of 30 to 70 μm. That is, the resin film of one embodiment is able to exhibit excellent rubber elasticity as well as high durability, and these physical properties have never been achieved by the previous nitrile-based films or biodegradable films.

Hereinafter, the preferred Examples are provided for better understanding. However, the following Examples are for illustrative purposes only, and the invention is not intended to be limited by these Examples.

Preparation Example 1

Preparation of Polypropylene Carbonate Resin

A zinc-glutarate (Zn-glutarate) catalyst was used in copolymerizing propylene oxide and carbon dioxide to prepare a polypropylene carbonate resin according to the following method (Polymer Journal 1981, 13, 407; U.S. Pat. No. 5,026, 676).

Dry zinc-glutarate catalyst (1 g) and purified propylene oxide (30 g) were put into an autoclave reactor equipped with an agitator, and the reactor was purged with carbon dioxide under about 10 atm and then stirred for 10 minutes. The reactor was purged again with carbon dioxide under about 50 atm and then allowed to warm up to 60° C. for about 24 hours of reaction. After completion of the reaction, unreacted propylene oxide was removed under reduced pressure and dissolved in dichloromethane solvent. The solution was washed with an aqueous HCl solution (0.1 M) and precipitated with a methanol solvent to yield a polypropylene carbonate resin. The collected resin was about 25 g and identified by a nuclear magnetic resonance spectrum. The weight average molecular weight of the resin as measured by GPC was 250,000.

Preparation Example 2

Preparation of Polyethylene Carbonate Resin

Diethyl-zinc catalyst was used in copolymerizing ethylene oxide and carbon dioxide to prepare a polyethylene carbonate resin according to the following method (Journal of Polymer Science B 1969, 7, 287; Journal of Controlled release 1997, 49, 263).

Dry diethyl-zinc catalyst (1 g) and dioxane solvent (10 mL) were put into an autoclave reactor equipped with an agitator. To this was added dioxane solvent (5 mL) diluted with purified water (0.1 g) while the reactor were being stirred slowly. The reactor was purged with carbon dioxide under about 10 atm and then stirred at 120° C. for 1 hour. Purified ethylene oxide (10 g) was added. The reactor was purged again with carbon dioxide under about 50 atm and then allowed to warm up to 60° C. for about 48 hours of reaction. After completion of the reaction, unreacted ethylene oxide was removed under reduced pressure and dissolved in dichloromethane solvent. The solution was washed with an aqueous HCl solution (0.1 M) and precipitated with a methanol solvent to yield a polyethylene carbonate resin. The collected resin was about 15 g and identified by a nuclear magnetic resonance spectrum. The weight average molecular weight of the resin as measured by GPC was 230,000.

[Experimental Method]

In the following Examples and Comparative Examples, all the experiments dealing with air- or water-sensitive compounds were carried out using standard Schlenk or dry box techniques.

1) Nuclear magnetic resonance spectra were obtained with a Bruker 600 spectrometer, and 1H NMR was measured at 600 MHz.

2) Weight average molecular weight of the polymer was measured by GPC (gel permeation chromatography), and a polystyrene sample was used as a standard.

3) For measurement of the solid content in the composition, a Halogen Moisture Analyzer (HB43-S.Mettler Toledo) was used, and moisture and other solvents were evaporated at a temperature of about 110° C. and the weight of the residual solid components was measured.

4) Size of the resin particles contained in the composition was measured using a particle size analyzer (NICOMP380) at a temperature of about 23° C.

5) Presence of the first surfactant and the second surfactant in the resin particles was identified by MALDI-TOF Mass of the supernatant and the precipitate obtained from centrifugation of the emulsion composition.

6) Viscosity of the composition was measured using Brookfield LV at a temperature of about 23° C.

Example 1

About 720 g of dichloromethane, about 2.6 g of hexadecane (second surfactant), and about 80 g of the polyethylene carbonate resin according to Preparation Example 2 were mixed and solid components were dissolved to prepare an organic solution.

Separately, about 5.2 g of sodium dodecyl benzene sulfonate was added to about 300 g of distilled water, and stirred to prepare an aqueous solution containing the first surfactant.

The organic solution was slowly added to the aqueous solution under stirring at about 10,000 rpm for about 20 minutes for stabilization to prepare an emulsion composition containing resin particles. Thereafter, dichloromethane was separated from the emulsion composition using a rotary evaporator to prepare a final polyethylene carbonate emulsion composition.

At this time, it was confirmed that the solid content of the composition was about 25% by weight, the diameter of the resin particle was about 280 to 320 nm, and the viscosity of the composition was about 4.5 cP.

Presence of the first surfactant and the second surfactant in the resin particles was identified by MALDI-TOF Mass of the supernatant and the precipitate obtained from centrifugation of the emulsion composition. At this time, it was found that the first surfactant corresponding to about 97% by weight of the total content of the added first surfactant and the second surfactant of less than about 1% by weight were contained in the supernatant. It was also found that the second surfactant corresponding to about 99% by weight of the total content of the added second surfactant and the first surfactant of less than about 3% by weight were contained in the precipitate. Referring to the analysis result and difference in hydrophilicity between the first surfactant and the second surfactant, it could be expected that the resin particle was formed to have a structure of containing the polyethylene carbonate resin and the second surfactant at its core and the first surfactant at its surface.

Further, it was found that the coagulation formed at about 24 hours after preparation of the emulsion composition was about 4% by weight, based on the total solid components.

Example 2

An emulsion composition was prepared under the same conditions and in the same manner as in Example 1, except that the content of hexadecane (second surfactant) was controlled to about 5.2 g during preparation of the organic solution.

At this time, it was confirmed that the solid content of the composition was about 25% by weight, the diameter of the resin particle was about 300 to 350 nm, and the viscosity of the composition was about 4.5 cP.

Example 3

An emulsion composition was prepared under the same conditions and in the same manner as in Example 1, except that about 0.4 g of a hydrophilic polymer, sodium carboxymethyl cellulose was further added during preparation of the organic solution.

At this time, it was confirmed that the solid content of the composition was about 25% by weight, the diameter of the resin particle was about 300 to 400 nm, and the viscosity of the composition was about 21 cP.

Example 4

About 720 g of dichloromethane, about 2.6 g of hexadecane (second surfactant), and about 80 g of the polyethylene carbonate resin according to Preparation Example 2 were mixed and solid components were dissolved to prepare an organic solution.

Separately, about 5.2 g of sodium dodecyl benzene sulfonate was added to about 300 g of distilled water, and stirred to prepare an aqueous solution containing the first surfactant.

The aqueous solution was slowly added to the organic solution under stirring at about 10,000 rpm to induce phase inversion. After phase inversion, the mixture was stirred at about 10,000 rpm for about 5 minutes for stabilization to prepare an emulsion composition containing resin particles. Thereafter, dichloromethane was separated from the emulsion composition using a rotary evaporator to prepare a final polyethylene carbonate emulsion composition.

At this time, it was confirmed that the solid content of the composition was about 25% by weight, the diameter of the resin particle was about 350 to 500 nm, and the viscosity of the composition was about 4.5 cP. Presence of the first surfactant and the second surfactant in the resin particles was identified by MALDI-TOF Mass of the supernatant and the precipitate obtained from centrifugation of the emulsion composition. Referring to difference in hydrophilicity between the first surfactant and the second surfactant, it could be expected that the resin particle was formed to have a structure of containing the polyethylene carbonate resin and the second surfactant at its core and the first surfactant at its surface.

Comparative Example 1

An emulsion composition was prepared under the same conditions and in the same manner as in Example 1, except that no hexadecane (second surfactant) was added during preparation of the organic solution.

At this time, it was confirmed that the solid content of the composition was about 25% by weight, the diameter of the resin particle was about 650 to 800 nm, and the viscosity of the composition was about 4.5 cP. Further, it was found that the coagulation formed at about 24 hours after preparation of the emulsion composition was about 18% by weight, based on the total solid components.

Control Example 1

Preparation of Nitrile Latex Composition

A high-pressure reactor which was equipped with an agitator, a thermometer, a cooler, an inlet tube for a nitrogen gas, and equipped so as to continuously introduce raw materials was prepared. Air inside the reactor was replaced by nitrogen gas, and then 2 parts by weight of alkyl benzene sodium sulfonate, 0.5 parts by weight of t-dodecyl mercaptan and 140 parts by weight of ion exchanged water were injected, based on 100 parts by weight of monomer mixture containing 30% by weight of acrylonitrile, 66% by weight of 1,4-butadiene, and 4% by weight of methacrylic acid, and the temperature was raised to about 40° C.

After the temperature was raised, 0.3 parts by weight of a polymerization initiator, potassium persulfate was added. When a conversion rate reached 95%, 0.1 parts by weight of sodium dimethyldithiocarbamate was injected to terminate the polymerization. Subsequently, unreacted monomers were removed through a deodorization process and a nitrile latex composition was obtained by adding ammonia water, an antioxidant, an antifoaming agent or the like.

Experimental Example 1

A calcium nitrate-coated glass mold was dipped in each of the emulsion compositions according to Examples 1~4, Comparative Example 1, and Control Example 1 for about 15 seconds, and then moisture was dried at about 130° C. to form a resin film. Thereafter, leaching was performed using running water for about 1 minute, and then moisture was dried at about 130° C. to form each resin film.

Three or four dumbbell-shaped test specimens were made using each of the resin films according to ASTM D 412. Using a Zwick/Z010 model (manufactured by Zwick/Roell Inc.), tensile strength (MPa), elongation (%), modulus of elasticity at 300% elongation and modulus of elasticity at 500% elongation of each resin film were measured at a rate of 500 mm/min.

The content of the polymer coagulation produced at 24 hours after preparation of the emulsion composition was measured. When the content is 5% by weight or less, it was evaluated as 'good', when the content is more than 5% by weight and 10% by weight or less, it was evaluated as 'fair', and when the content is more than 10% by weight, it was evaluated as 'poor'.

Figure 2:
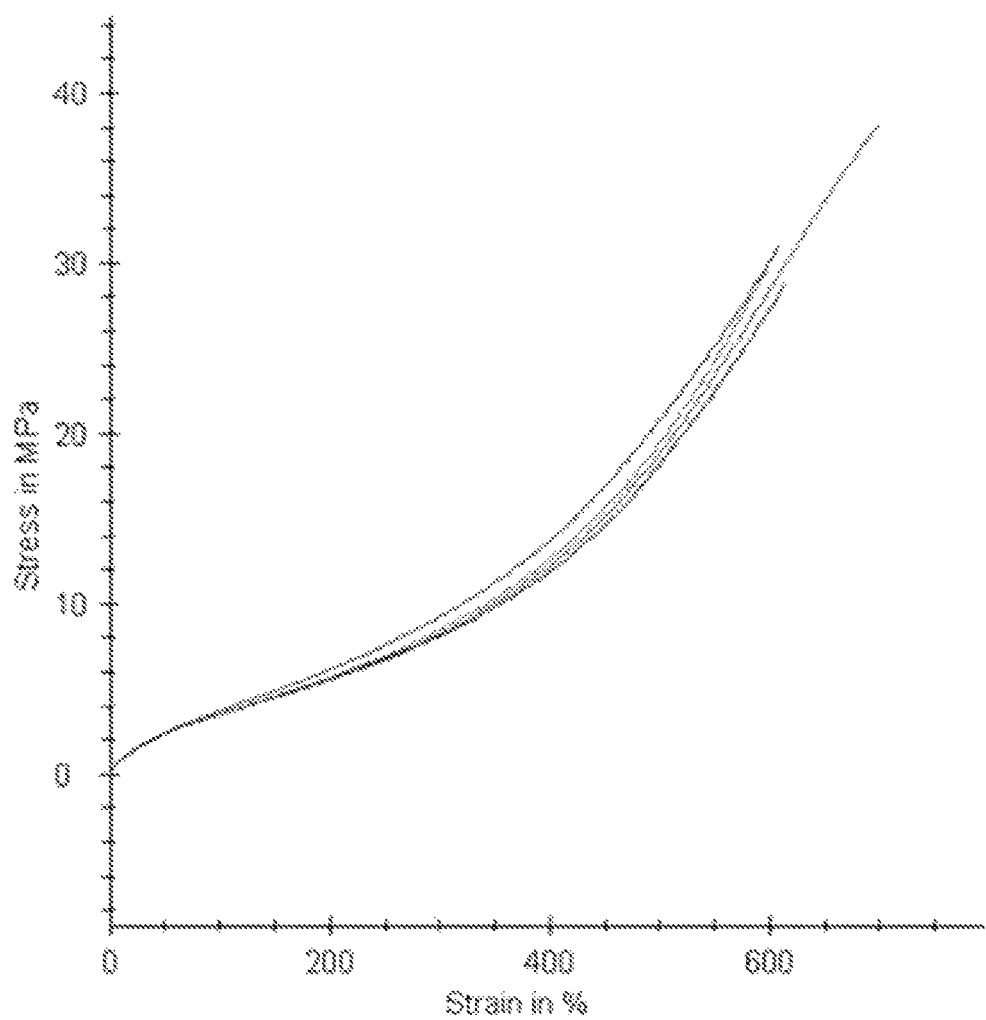
FIG. 2 is a graph (S-S curve) of tensile properties of the resin film according to Control Example 1 of the present invention.
Figure 3:
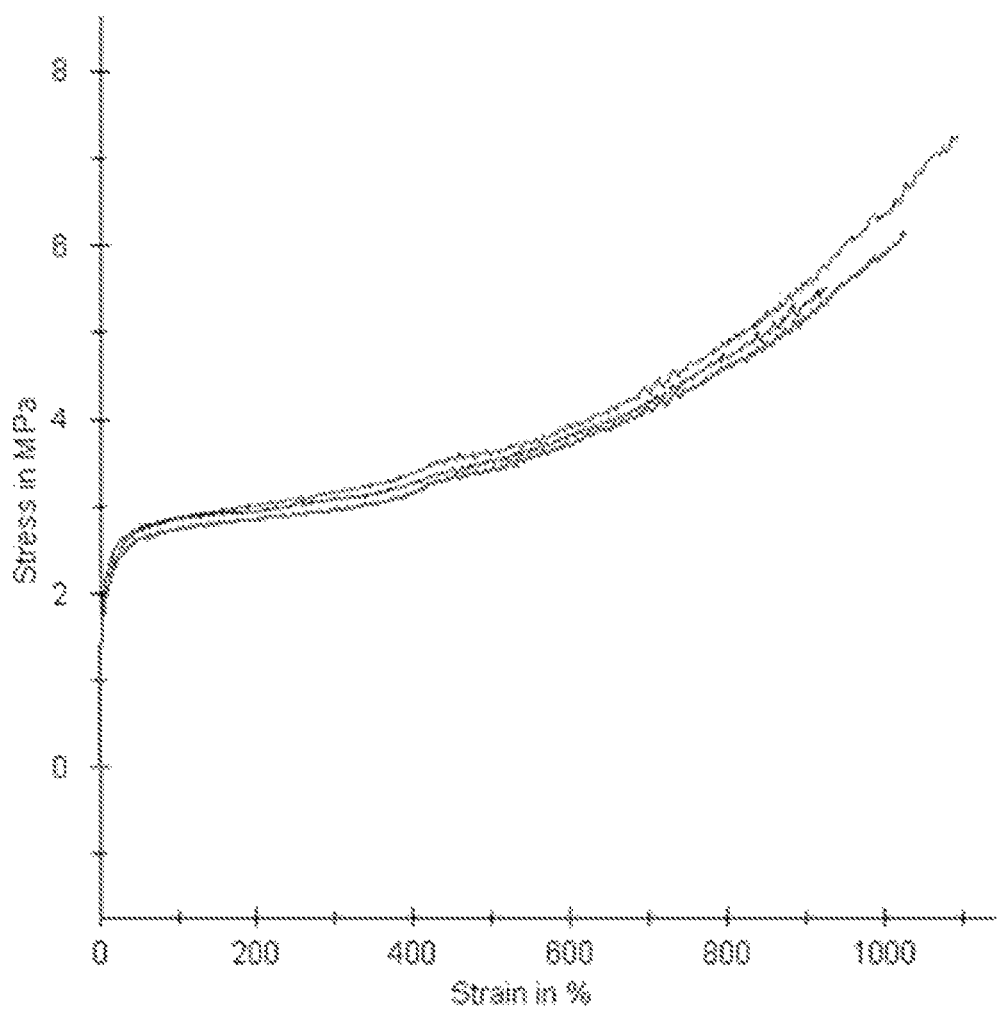
FIG. 3 is a graph (S-S curve) of tensile properties of the resin film according to Comparative Example 1 of the present invention.

The results of measuring the physical properties are summarized in the following Table 1, and S-S curves of the resin films of Example 1, Control Example 1, and Comparative Example 1 are shown in FIGS. 1 to 3, respectively. Herein, the graphs of FIGS. 1~3 show the results of measuring those of each one sample (FIG. 1: resin film of Example 1, FIG. 2: resin film of Control Example 1, FIG. 3: resin film of Comparative Example 1) three~four times, and in the following Table 1, mean values of the measured data are shown.

For comparison, physical properties of the resin film having the same thickness and consisting of a polyvinyl chloride resin or natural rubber that has been typically used for manufacturing the conventional disposable resin molded products were measured in the same manner, and also shown in the following Table 1.

TABLE 1

| | Tensile strength (MPa) | Elongation (%) | Modulus at 300% elongation (MPa) | Modulus at 500% elongation (MPa) | Emulsion stability (coagulation wt %) |
|---|---|---|---|---|---|
| Example 1 | 16 | 1265 | 3.8 | 4.8 | Good (4) |
| Example 2 | 11 | 1430 | 2.8 | 3.5 | Good (4) |
| Example 3 | 13 | 1407 | 3.2 | 4.0 | Good (2 or less) |
| Example 4 | 12 | 853 | 3.8 | 4.9 | Fair (5~8) |
| Comparative Example 1 | 7 | 1015 | 3.1 | 3.8 | Poor (18) |
| Control Example 1 | 28 | 586 | 9.6 | 20.9 | — |
| PVC | 14 | 550 | 8.3 | 12.6 | — |
| Natural rubber | 25 | 1047 | 2.5 | 5.0 | — |

Referring to the experimental results, it was confirmed that resin films according to Examples 1 to 4 showed rubber-like elasticity and more excellent elongation than the nitrile resin film (Control Example 1) which have been applied to the conventional disposable resin molded products, in particular, much lower stress at 300% and 500% than the nitrile resin film. Further, because the films according to Examples 1 to 4 have excellent touch, it is possible to manufacture high-quality molded products.

In contrast, the resin film according to Comparative Example 1 showed low tensile strength and elongation, compared to the films of Examples. In particular, stability of the emulsion composition was very low, and the content of effective solid components in the composition was low. The thickness of the formed film was not uniform, and therefore, it is impossible to manufacture a stable resin molded product.

The invention claimed is:

1. An emulsion composition for manufacturing a polyalkylene carbonate molded product, comprising
   a continuous phase containing water; and
   resin particles which are dispersed in the continuous phase and include a polyalkylene carbonate resin, a first surfactant, and a second surfactant,
   wherein the second surfactant concentration is higher at the core of the particle than at the surface of the particle and the first surfactant concentration is higher at the surface of the particle than at the core of the particle, and
   wherein the content of the first surfactant at the core of the resin particle is less than 5% by weight, based on the total weight of the first surfactant included in the resin particle.

2. The emulsion composition according to claim 1, wherein the content of the first surfactant farther away from half the particle radius from the center of the resin particle is 95% by weight or more, based on the total weight of the first surfactant included in the resin particle.

3. The emulsion composition according to claim 1, wherein the content of the second surfactant at the core of the resin particle is 95% by weight or more, based on the total weight of the second surfactant included in the resin particle.

4. The emulsion composition according to claim 1, wherein the content of the second surfactant farther away from two-thirds of the particle radius from the center of the resin particle is less than 5% by weight, based on the total weight of the second surfactant included in the resin particle.

5. The emulsion composition according to claim 1, wherein the resin particle includes 1 to 20 parts by weight of the first surfactant and 1 to 20 parts by weight of the second surfactant, based on 100 parts by weight of the polyalkylene carbonate resin.

6. The emulsion composition according to claim 1, wherein a weight ratio of the second surfactant to the first surfactant is 1:0.1 to 1:2.

7. The emulsion composition according to claim 1, wherein the resin particle has a diameter of 200 to 600 nm.

8. The emulsion composition according to claim 1, wherein the solid content is 10 to 50% by weight, based on the total weight of the composition.

9. The emulsion composition according to claim 1, wherein the composition has a viscosity at 23° C. of 1 to 70 cP.

10. The emulsion composition according to claim 1, wherein the polyalkylene carbonate resin includes a repeating unit represented by the following Chemical Formula 1:

[Chemical Formula 1]

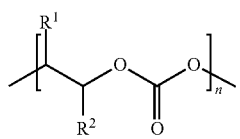

wherein n is an integer of 10 to 1000,
$R^1$ and $R^2$ are each independently hydrogen, an alkyl group having 1 to 20 carbon atoms, an aryl group having 6 to 20 carbon atoms, an alkenyl group having 1 to 20 carbon atoms, or a cycloalkyl group having 3 to 20 carbon atoms, and $R^1$ and $R^2$ are connected to each other to form a cycloalkyl group having 3 to 10 carbon atoms.

11. The emulsion composition according to claim 1, wherein the polyalkylene carbonate resin has a weight average molecular weight of 10,000 to 1,000,000.

12. The emulsion composition according to claim 1, wherein the first surfactant is one or more compounds selected from the group consisting of anionic surfactants and nonionic surfactants.

13. The emulsion composition according to claim 1, wherein the first surfactant is one or more compounds selected from the group consisting of carboxylic acid salts, sulfonic acid salts, sulfuric acid ester salts, phosphoric acid ester salts, quaternary ammonium salt, ether, esterether, ester, and nitrogen-containing surfactants.

14. The emulsion composition according to claim 1, wherein the second surfactant is one or more compounds selected from the group consisting of alcohols having 10 to 40 carbon atoms, alkanes, mercaptans, carboxylic acids, ketones, amines, and nonionic surfactants having HLB (Hydrophile-Lipophile Balance) of 11 or less.

15. The emulsion composition according to claim 1, wherein the resin particle further includes one or more hydrophilic polymers selected from the group consisting of cellulose, polyvinyl alcohol, polyacrylic acid, and polymethacrylic acid.

16. The emulsion composition according to claim 1, wherein the resin particle further includes one or more organic solvents selected from the group consisting of methyl acetate, ethyl acetate, propyl acetate, isopropyl acetate, vinyl acetate, methyl ethyl ketone, dichloromethane, dichloroethane, chloroform, acetonitrile, methylpyrrolidone, dimethyl sulfoxide, nitromethane, nitropropane, caprolactone, acetone, polypropylene oxide, tetrahydrofuran, benzene, and styrene.

* * * * *